United States Patent
Blake et al.

(10) Patent No.: US 11,683,703 B2
(45) Date of Patent: Jun. 20, 2023

(54) NETWORK MONITORING SYSTEM AND METHOD

(71) Applicant: SPATIALBUZZ LIMITED, Guildford (GB)

(72) Inventors: Andrew Robert Blake, Guildford (GB); Michael Shannon, Redhill (GB); Christopher John Haslett, Burgh Heath (GB)

(73) Assignee: SPATIALBUZZ LIMITED, Guildford (GB)

( * ) Notice: Subject to any disclaimer, the term of this patent is extended or adjusted under 35 U.S.C. 154(b) by 46 days.

(21) Appl. No.: 17/214,136

(22) Filed: Mar. 26, 2021

(65) Prior Publication Data

US 2021/0306877 A1    Sep. 30, 2021

(30) Foreign Application Priority Data

Mar. 27, 2020  (GB) .................................... 2004451

(51) Int. Cl.
*H04W 24/04*    (2009.01)
*H04W 24/10*    (2009.01)

(52) U.S. Cl.
CPC .......... *H04W 24/04* (2013.01); *H04W 24/10* (2013.01)

(58) Field of Classification Search
None
See application file for complete search history.

(56) References Cited

U.S. PATENT DOCUMENTS

| 2011/0246640 A1 | 10/2011 | Saha et al. |
| 2013/0053023 A1 | 2/2013 | Meredith et al. |
| 2017/0019291 A1 | 1/2017 | Tapia et al. |

FOREIGN PATENT DOCUMENTS

| EP | 2943001 A1 | 11/2015 |
| GB | 2546119 A | 7/2017 |
| WO | 2017218686 A2 | 12/2017 |

OTHER PUBLICATIONS

Patents Act 1977: Search Report under Section 17 for Application No. GB2004451.7 dated Sep. 10, 2020, 8 pages.

*Primary Examiner* — Robert M Morlan
(74) *Attorney, Agent, or Firm* — Aikin & Gallant, LLP (57) ABSTRACT

A method of identifying faults in a utility supply network is disclosed. The method comprises identifying a first indication of a fault in the communications network based on a number of network performance queries received from users of user equipments (UEs) connected to the communications network within a first region of the communications network. The method further comprises identifying a second indication of a fault in the communications network based on network performance data associated with the first region. It is determined that a fault exists in the communications network based on identification of the first indication and the second indication.

14 Claims, 5 Drawing Sheets

NETWORK MONITORING SYSTEM AND METHOD

CROSS REFERENCE TO RELATED APPLICATIONS

The present application claims the priority benefit of United Kingdom Patent Application No. GB 2004451.7, entitled "NETWORK MONITORING SYSTEM AND METHOD" and filed on Mar. 27, 2020, which is incorporated by reference herein in its entirety.

FIELD OF THE INVENTION

The invention relates to methods of monitoring a utility supply network, such as a communications network, and to a network monitoring system.

BACKGROUND

Faults occur in utility supply networks, as in all other complex technical systems. In cellular communications networks, such faults include the failure of hardware components in the base-stations of a mobile network, and failures in other systems which are connected to multiple base-stations. For example faults in the radio network controller (RNC) in a 3G system may result in the loss of operation of large sections of the network (e.g. all node B base-stations connected to the RNC). Similarly, failures to switching and other more centralised functions can also impact multiple areas of the network simultaneously.

When such failures occur, it is important to identify them as quickly as possible, so that simple, remote, measures may be taken to alleviate the fault (e.g. re-setting a piece of network equipment) or so that a maintenance team can be dispatched to repair the fault and restore service to the customers of the network. It is also important to enable customers to be kept informed about the fact that a failure has occurred, and about the progress of any repair and the likely time at which service will be restored. Such information on service failures and repair progress may be provided by a telephone operator on a 'helpline' provided by the network operator or via a web-page, mobile phone 'App' or other similar interface available to the end user of the network services.

In other situations, network services may be suspended in order to carry out planned maintenance or upgrades to the network. In such circumstances, the elements of the network (e.g. base-station or stations) which will be affected are known in advance and the duration of the service outage can also be estimated with a reasonable degree of certainty.

In still other situations, poor service may occur as a result of congestion on the network—i.e. too many users attempting to make use of the network's resources, simultaneously. Such situations can occur, for example, during rush hour at a busy train station or around the time of an irregular event, such as a sports match or music concert, at a particular location.

In conventional systems, operators rely upon a disparate array of systems for managing and reporting faults, planned network outages, progress updates for repairs which are underway and the identification and location of congestion events and other aspects which impact the customer's experience of a mobile operator's network. As a customer, however, all of the above causes result in a single outcome: poor (or no) mobile service. Reporting the fact that such issues are known (or not, which may indicate a problem with the user's mobile device) and when they are likely to be resolved, is becoming increasingly important, in the quest to retain customers and reduce customer 'churn' (customers moving from one service provider to another).

Current reporting mechanisms generate hundreds or thousands of alarms across a network simultaneously—far more than a network operations team can sensibly deal with. Many items of equipment within a network are fitted with a range of alarms, both to indicate major failures and more minor warnings. For example a major failure indication my occur if a base-station's RF output power drops to zero when it should be dealing with traffic (e.g. during a busy part of the day), whereas a warning alarm may result from the output power being at a lower level than that to which it has been set (but it has not dropped to zero).

These alarms are not necessarily indicative of a major issue with that particular part of the network and it is difficult for an operator to prioritise which alarms indicate faults that should be dealt with as a high priority and those which can safely be delayed for hours, days, weeks, or even until the next scheduled maintenance visit (which may be many months away). For example, in the case of low power output, network performance may still be adequate to serve the users of the affected area.

Typically, a network operator may attempt to rank alarms based on crude measures, such as a number of users typically served by a given network area, the revenue generated by a particular network area, or the perceived value of users within the affected area. However, such rankings may not provide an accurate picture of the needs of the network and its users, and may lead the operator to focus on alarms that are not the most urgent, or even alarms that do not require repair at all.

Users may themselves report network problems, but there is an issue of 'confidence' in regard to such user-reported network issues—at what point should an operator begin to take notice of, and act upon, user-reported problems in a particular part of the network? User reports/queries are in general subjective—they depend upon the views of the user (e.g. their perception of network speed), rather than objective data points, and so it is not clear what weight to give such subjective reports. At present, an operator is unlikely to take notice of two or three reports in a particular area, however these reports may be the start of a flood of such reports, at which point the operator has a large number of dissatisfied customers. It would be much better to fix the problem before it affects a large number of network users.

One option currently used to try and solve these issues is to monitor and store all of the measurement data taken by every base-station in the network (e.g. network performance characteristics measured by components of the network). The collection and storage of this data is a huge task and involves a vast amount of computing resources, yet it still only provides a network-centric view of what is happening, ignoring the user experience.

SUMMARY OF THE INVENTION

In accordance with a first aspect of the invention there is provided a method of identifying faults in a utility supply network, the method comprising:
    identifying a first indication of a fault in the network based on a number of network performance queries received from users of user equipments (UEs) connected to the network within a first region of the network;

identifying a second indication of a fault in the network based on network performance data associated with the first region; and determining a fault exists in the network based on identification of the first indication and the second indication.

Network performance data is data measured by the network, a component of the network, or a UE connected to the network. For example, it may comprise component alarms, measurements of network performance characteristics (e.g. data rate), known outages, or expected/planned network performance.

This method uses the combination of objective measurements of network performance data and subjective data (i.e. user queries/reports) to determine that a fault exists. Only if both types of indication suggest a problem is it determined that there is a fault in the network. As a result, the method identifies faults which have a significant impact on user experience—allowing the network operator to prioritise those faults whilst de-prioritising less significant problems, such as equipment-generated alarms, which may either be false or signify issues having a low impact on users or actual faults which have only a minor impact on the user experience.

The first region may be a geographical region, such as a predefined geographical area within a coverage map of the network, or a region served by a particular base-station. Alternatively, the first region may be a schematic region within the network infrastructure, such as a particular grouping of network components, through which the UEs connect to the network.

In some embodiments, identifying the first indication comprises:

counting the number of the network performance queries received within a measurement period;

comparing the number to a query threshold; and identifying the first indication of a fault if the number exceeds the query threshold.

The query threshold may be selected based on the nature of the first region. For example, the query threshold may be selected based on an actual or expected density of users connecting to the network in a first region. The query threshold for a particular first region may vary, for example depending on the time of day. The measurement period may be a predetermined value, such as 2-5 hours, or may itself vary based on the nature of the region, the time of day, expected user density, etc.

In some such embodiments, identifying the second indication comprises:

receiving first network performance data associated with the first region and with the measurement period;

comparing the first network performance data to second network performance data associated with the first region and associated with a time period prior to the measurement period; and identifying the second indication based on the comparison of the first network performance data to second network performance data.

The first network performance data associated with the measurement period may be data measured/recorded (e.g. by a network monitoring system) within the measurement period, or, more generally, measured/recorded recently, such as within the time of higher than average user queries. The second network performance data associated with a time period prior to the measurement period may be data measured before the measurement period, or before the period of higher than usual queries. The first/second network performance data may be associated with the first region in that they provide an indication of network performance within that first region. The second network performance data is data that corresponds to the first network performance data—i.e. it is the same type of network performance characteristic, same component alarm status, etc.

In some embodiments, identifying the second indication based on the comparison of first network performance data to second network performance data may comprise:

identifying a degradation in network performance in the first network performance data compared to the second network performance data;

comparing the degradation to a degradation threshold; and identifying the second indication if the degradation exceeds the degradation threshold.

The degradation threshold may be selected based on the type of network performance data being considered. The degradation threshold may be a percentage reduction in performance, such as a percentage reduction selected from the range 10%-50%, or may be a fixed logarithmic reduction amount, such as a 5-15 dB reduction. The degradation threshold may vary based on the nature of the region (e.g. rural or urban), the expected user density, the time of day, time of week, time of year, etc.

In some embodiments, the first network performance data may comprise triggered measurements, the triggered measurements measured (e.g. by one or more UEs connected to the network) in response to one or more of the network performance queries received in the measurement period. The second network performance data may comprise scheduled measurements, the scheduled measurements measured (e.g. by one or more UEs connected to the network) and stored in accordance with a predetermined measurement schedule.

In some embodiments, the method further comprises confirming the identification of the second indication based on known issues affecting network performance in the first region. For example, alarms, known outages, and/or existing trouble tickets (i.e. reported or known problems) may be used to confirm that there is an issue. This provides an additional step to ensure that a fault truly exists, as well as providing additional information to assist in the determination of the cause of the fault.

In some embodiments the network performance data may comprise network performance measurements taken by a UE connected to the network in the first region.

Some embodiments may further comprise the step of determining a component of the network likely responsible for the fault based on the network performance queries and the network performance data.

Some embodiments may further comprise initiating a repair process to correct the identified fault.

In some such embodiments, the method may comprise, after completion of the repair process, confirming successful repair of the fault based on network performance queries, and/or network performance data received after completion of the repair process, and/or based on the number of UEs connected to the network in the first region after completion of the repair process. For example, the repair verification method of any embodiment of the fifth aspect of the invention may be used to confirm successful repair.

In some embodiments in which the network comprises a plurality of predefined regions, the method may further comprise receiving a network performance query from a user of a UE connected to the network, and assigning the network performance query to a region of the plurality of predefined regions. The assigned region may then be taken as the first region in the method described above.

In some embodiments, the network measurement data may comprise a network performance characteristic, which may be at least one of: average transmitted data rate, average received data rate, peak transmitted data rate, peak received data rate, average throughput, average bit error rate, peak bit error rate, received signal strength, packet latency, and packet jitter. The network performance characteristic may be measured by a UE connected to the network (giving a user-centric view of network performance). Such characteristics may be reported as part of a triggered or scheduled measurement reporting process described in more detail below.

In some embodiments, the utility supply network may be a communications network.

According to a second aspect of the invention there is provided a computer program comprising instructions which, when executed by a computer, cause the computer to carry out the method of any embodiment of the first aspect.

According to a third aspect of the invention there is provided a network monitoring system for monitoring performance of a utility supply network, wherein the system is configured to receive network performance queries from users of UEs connected to the network, and to receive network performance measurements, wherein the system comprises:
at least one processor, and
a memory storing instructions which, when executed by the at least one processor, cause the processor to perform the method of any embodiment of the first aspect.

In some embodiments, the system may comprise:
a database for storing network performance data;
an asynchronous subsystem configured to receive scheduled network performance data from a plurality of UEs connected to the network, and to store the scheduled network performance data in the database; and
a synchronous subsystem configured to receive triggered network performance data from at least one UE connected to the network, and to store the triggered network performance data in the database.

According to a fifth aspect of the invention there is provided a method of verifying repair of a component in a utility supply network, the method comprising:
receiving an indication that a repair of the component has been completed at a repair time, the component associated with a first region of the network;
determining a measure of the number of user equipments (UEs) that have connected to the network in the first region after the repair time;
comparing the measure of the number of UEs connected within the measurement period to a first threshold; and
determining whether repair of the component was successful based on the comparison of the measure of the number of UEs to the first threshold.

The measure of the number of UEs connected may be a direct count of the number of connected UEs, or an indirect method that provides an indication of the likely number of UEs connected.

The measure of the number of UEs connected may be a measure of the number of UEs connected within a measurement period, the measurement period starting after the repair time. Alternatively, the measure of the number of UEs may be a measure of the number of UEs making active use of the network at a particular time, the particular time being a time after the repair time.

If the measure of the number of UEs connected exceeds the first threshold, it may be determined that repair of the component was successful. In other words, if a large enough number of UEs in the first region are able to send user reports, it can be assumed that the repair was successful.

Such a method allows repairs to be remotely verified, based on actual use of the repaired component/network area. Advantageously, this method avoids the lag that would result from waiting for user queries/network data measurements to build up indicating that a problem exists.

The first region may be a geographical region or a network architecture region associated with the repaired component. For example, the first region may comprise the network infrastructure and/or connected UEs which connect to the (central) network via the repaired component.

The measurement period and/or first threshold may be selected based on, for example, a region type of the first region (e.g. rural or urban), a time of day, or an expected/average number of UEs usually connected to the network in the first region.

In some embodiments, determining a measure of the number of UEs that have connected to the network in the first region comprises:
receiving network performance reports from UEs connected to the network in the first region, the network performance reports comprising measurements of network performance characteristics measured by the respective UE; and
determining the number of network performance reports received within a measurement period to determine the measure of the number of connected UEs, wherein the measurement period is a period after (or starting at) the repair time.

The network performance reports may comprise triggered measurements (i.e. sent in response to a request by the network), and/or scheduled measurements (i.e. sent according to a predetermined schedule). Where the reports comprise triggered measurements, the method may further comprise requesting network performance reports from UEs connected to the network in the first region.

In some embodiments, determining whether repair of the component was successful may comprise:
determining that the measure of the number of UEs connected within the measurement period does not exceed the first threshold:
determining a number of network usage events from UEs connected to the network in the first region;
comparing the number of network usage events to a second threshold; and
if the number of network usage events exceeds the second threshold, determining that the repair of the component was successful.

If the number of network usage events does not exceed the second threshold, it may be determined that the repair was unsuccessful.

Determining the number of network usage events may comprise determining the number of events in the measurement period, or a measurement period (i.e. of different length to the measurement period for network performance reports). Alternatively, determining the number of network usage events may comprise determining the number of active events at a particular time.

The network usage events may for example comprise at least one of: voice calls, data calls, and SMS messages.

Such methods provide a second check on the network usage to determine if a repair was successful. Even if the indication of the number of users connected to the network does not exceed the first threshold, a repair can still be considered successful.

In some embodiments, determining a measure of the number of UEs that have connected to the network in the first region after the repair time may comprise:
  determining the number of network usage events from UEs connected to the network in the first region to determine the measure of the number of connected UEs.

Determining the number of network usage events may comprise determining the number of events in the measurement period. Alternatively, determining the number of network usage events may comprise determining the number of active events at a particular time. In the latter case, the number of active events may be considered indicative—i.e. a measure—of the number of connected UEs within a measurement period.

In some such embodiments, determining whether repair of the component was successful may comprise:
  determining that the measure of the number of UEs connected within the measurement period does not exceed the first threshold:
  receiving network performance reports from UEs connected to the network in the first region, the network performance reports comprising measurements of network performance characteristics measured by the respective UE; and
  determining the number of network performance reports received (in particular within the, or a, measurement period);
  comparing the number of network performance reports to a third threshold; and
  if the number of network performance reports exceeds the third threshold, determining that the repair of the component was successful.

If the number of network usage events does not exceed the third threshold, it may be determined that the repair was unsuccessful.

In some embodiments, the network usage events may comprise a plurality of network usage event types. Determining the number of network usage events may comprise applying a weighting to each network usage event based on its respective network event type. For example, phone calls and SMS messages may be used as two different network usage event types. SMS messages use fewer network resources than phone calls, and so the number of SMS messages may be given less weight than phone calls in determining if the network is operating correctly in the first region.

In some embodiments, the length of the measurement period may be selected based on at least one of: an expected number of users of the first location and/or component; a location type of the first region; a time of day; a time of week; a time of year. The measurement period may in some cases be very short, such that a 'snapshot' is taken of a particular time (e.g. number of active calls in the first region).

In some embodiments, the first threshold may be selected based on at least one of: an expected number of users of the first location and/or component; a location type of the first region; a time of day; a time of week; a time of year. The second and third thresholds may be based on similar considerations.

In some embodiments, comparing the measure of number of UEs to the first threshold (or equivalently for the second or third thresholds) may comprise first comparing the measure to an absolute threshold. If the absolute threshold is met, the repair is deemed successful. If the absolute threshold is not met, the measure is compared to a relative threshold. The relative threshold may be based on, for example, the region type of the first region, time of day, etc. If this relative threshold is met, the repair is deemed successful.

In some embodiments, determining whether repair of the component was successful may comprise, upon determining that the measure of the number of UEs connected within the measurement period does not exceed the first threshold, determining that the repair of the component was not successful. In other words, in some embodiments the second verification step is not performed, the repair is deemed unsuccessful based solely on the comparison to the first threshold.

In some embodiments, the utility supply network may be a communications network.

According to a sixth aspect of the invention, there is provided a computer program comprising instructions which, when executed by a computer, cause the computer to carry out the method of any embodiment of the fifth aspect.

According to a seventh aspect of the invention, there is provided a network monitoring system for monitoring performance of a utility supply network, wherein the system comprises:
  at least one processor, and
  a memory storing instructions which, when executed by the at least one processor, cause the processor to perform the method of any embodiment of the fifth aspect.

BRIEF DESCRIPTION OF THE DRAWINGS

By way of example only, certain embodiments of the invention shall now be described by reference to the accompanying drawings, in which.

DETAILED DESCRIPTION

The present invention relates to network monitoring of a utility supply network. The following discussion uses a cellular communications network as an example network to illustrate the invention.

As has been discussed above, at any given time a network operator will receive a large number (hundreds or thousands) of alarms and other forms of fault indication. Some of these alarms will be trivial and indicate a state which is operationally acceptable, but perhaps requires attention at the next planned maintenance visit. An example of this might be a base-station mast-head power amplifier which is running hotter than it ordinarily should or an RNC cabinet temperature which is higher than normal. Most alarms, however, indicate some form of 'failure', for example a lower radio frequency power output from a base-station than should be produced based upon is operational state (e.g.

number and range-distribution of users) or a complete shutdown of a site. A network operator does not typically have the resources necessary to inspect, diagnose and repair all of these faults, or even a majority of them, and most networks have to 'live' with a tolerable degree of 'failure' at any given point in time. The operator therefore has to decide how best to deploy maintenance resources whilst achieving the best possible network performance for network users.

In conventional systems, this may be achieved by ranking the sites exhibiting faults based upon the number of users which typically operate via that site, i.e. giving a higher ranking to the sites which are typically the most popular. Other metrics may also be used, for example sites which generate the most revenue—these may not necessarily be the most popular, but may be frequented by the highest-value customers (e.g. cell sites located in a business district). Similar metrics may also be used for other equipment, such as RNCs or transmission links—these will typically result in greater numbers of inconvenienced users as they may well serve multiple sites; this is likely to put them at, or close to, the top of the maintenance ranking.

Whilst this method works, to a degree, it makes assumptions about the numbers of users impacted and about the users' perception of the failure. Taking an extreme example, if a site had failed and other, nearby sites then took over serving the affected users and all of the users were only sending occasional text messages (and doing nothing else), then those users would probably notice little or no difference to their service. The local BTS which had failed, however, might still appear as a high priority to repair, due to the large number of (originally) connected users. In reality, even if the site wasn't repaired for days or weeks, these (text-message-only) users would not notice and nor would they be dissatisfied customers. Conversely, a failed site with fewer but (say) heavy data users, would lead to many more complaints and a very dissatisfied user base.

An alternative approach would be to rank failed sites (or other network components or equipment alarms) according to how many users undertook a 'status check', i.e. used an app on their phone, a web-site, or a call-centre in order to check if there were known service problems at their location. Such checks are an indication of user dissatisfaction with the service they are receiving, as users rarely make such checks if they are receiving a good service. Whilst this mechanism may appear to solve the above ranking problem, there are a number of issues with it:

1) Users may be suffering congestion on the network which is unrelated to equipment failure, but will still undertake status checks.

2) Users may have experienced a small drop in performance, due to a failure in a local piece of network equipment, but are not suffering unduly. For example they may be experiencing a reduced, but still reasonable, data rate. Such users may well still undertake a status check, but would not be as unhappy as other users, elsewhere on the network, who had suffered a dramatic drop in data rate—the latter would be the higher-priority from a maintenance perspective.

3) Specific types of user may be suffering problems, whereas other users may be unaffected. For example heavy data users and gaming users would suffer if a latency-related problem occurred, whereas lighter data users and voice or text users may not notice a problem at all.

Embodiments of the architecture described herein solve the above problems by providing a mechanism for collecting and amalgamating both 'subjective' data (i.e. status queries and other user-reported metrics) and 'objective' data, such as network performance measurements taken by a user's mobile device of the service quality it is experiencing (e.g. received signal strength, transmitter output power, received and transmitted data rates, latency, voice quality, bit error rate, signal-to-interference, noise and distortion (SINAD) and any other metric which the handset is capable of reporting). An operator can therefore base identifying network problems based on both pieces of data. Thus for example, an operator may verify that user dissatisfaction, as evidenced by the number of status checks, is matched by a reduction in one or more objective measurement metrics as experienced by that same set of users and checked against any other nearby users (for example, connected to, or via, the same resource—BTS, RNC, transmission link etc.).

Likewise the operator can then report back to the dissatisfied users, acknowledging that there is a fault and providing an indication as to when it might be repaired (e.g. reporting via the app through which they communicated their dissatisfaction).

Figure 1:
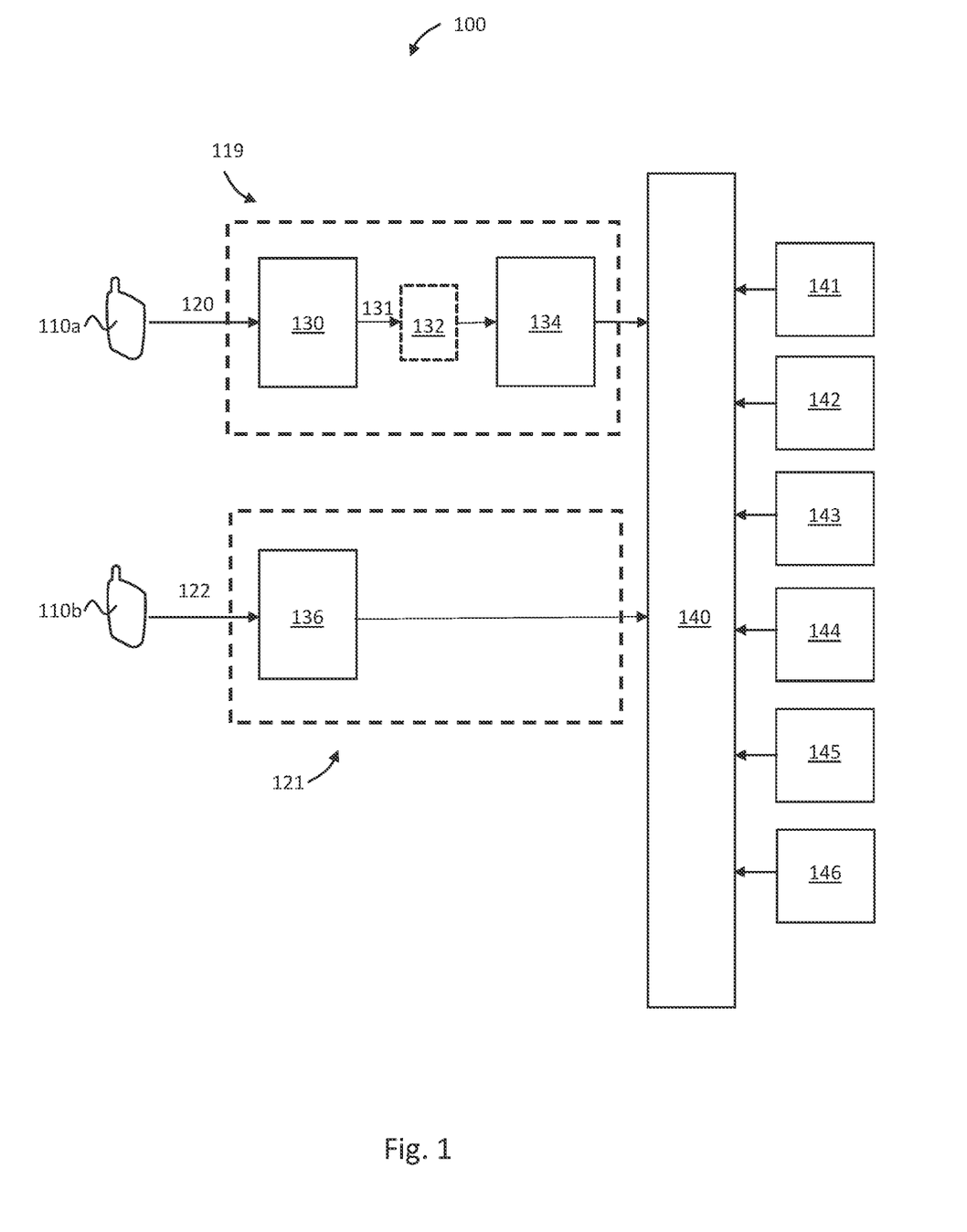
FIG. 1 illustrates a network monitoring system for collecting performance data about a communications network for use in diagnosing faults in the communications network.

An outline of the architecture of a network performance measurements capture system 100 is shown in FIG. 1. It is to be noted that each of the blocks within the diagram could be implemented by a physically separate piece of hardware, such as a computer, server, hard disk storage unit or other item of electronic hardware; or some functions could be combined into a single piece of hardware. It is also possible that some or all of these hardware items could be virtualized and be assigned to disparate hardware elements by a third-party service provider, such as a cloud computing services provider. In this case, a 'server' could actually be a virtual server, with tasks executed and spread across a number of physical hardware devices, potentially in different physical locations.

The network monitoring system 100 shown in FIG. 1 essentially consists of two main subsystems, which can be thought of as distinct data 'paths': an asynchronous or 'batch-data' subsystem 119 and a synchronous or 'live-data' subsystem 121.

Asynchronous Subsystem—Batch-Collection Path

The asynchronous subsystem 119 periodically (typically hourly) collects scheduled network performance measurements 120 from user devices 110*a* connected to the communications network. For example, data may be collected from all user devices 110*a* connected to the network with a network monitoring app installed. The asynchronous subsystem may comprise one or more inputs for receiving data from the UEs, in particular via the communications network. The asynchronous subsystem transfers the received measurements to a database 140, where they can be analysed to identify network faults.

Given the need to collect scheduled measurements 120 from so many mobile devices 110*a* connected to the communications network, the asynchronous subsystem 119 is designed to handle very large volumes of data. For example, although measurement data 120 is typically collected from each user device 110*a* every hour, the exact collection times from each individual user device 110*a* may be randomly staggered to ensure that not all mobile devices 110*a* are trying to send their measurement data 120 simultaneously.

The scheduled measurements 120 comprise measurements taken by the mobile device 110*a* of the network service quality it is experiencing (for example, received signal strength, transmitter output power, received and transmitted data rates, latency, voice quality, bit error rate, signal-to-interference, noise and distortion—SINAD—and any other metric which the mobile device 110*a* is capable of reporting).

In the illustrated system 100, asynchronous subsystem 119 comprises a measurement collection server 130 and a measurements batch processor 134.

The measurement collection server 130 generates a measurement report 131 for each set of scheduled measurements 120 from a mobile device 110a. The measurement report 131 contains the scheduled measurements 120 with a timestamp at which the measurements 120 were collected, and an identifier associated with the mobile device 110a (which is typically an anonymised version of the identifier provided by the mobile device 110a to protect user privacy). This type of measurement collection is classed as 'asynchronous' as it does not elicit the transmission of measurement data from the user device 110a, but instead waits for the user device 110a to send the data at a time of that device's choosing. This interval is typically hourly, but can be set by the network operator. The infrequent nature of this batch data is largely in order to preserve battery life, as discussed in co-pending application GB2573830, which is hereby incorporated herein by reference.

The measurement collection server 130 typically adds each measurement report data file 131 to a data queue 132 to await processing by the measurements batch processor 134.

The measurements batch processor 134 takes the measurement report data files 131 from the data queue 132 and essentially provides a translating/transformation process, converting the measurement report data files 131 and the data within them into the correct format to be stored efficiently in the database 140.

The data leaving the measurements batch processor 134 to enter the database 140 typically contains one or more of the following:

1) Anonymised identification—the identifier of the user device from which the data originated is discarded and an anonymous (random) identity is attached. This allows the data from a particular mobile device 110a to be assessed over time without (potentially) infringing the privacy of the user of the mobile device 110a. Anyone interrogating the database 140 would be unable to identify the mobile device 110a or its user, only that measurements have come from the same mobile device 110a or user.

2) A randomised identifier for the measurement report itself, to allow duplicates to be recognised and eliminated.

3) A location identifier indicating the network area in which the mobile device 110a was operating at the time the measurements were taken, and/or a location of the mobile device at the time of the measurements, such as a GPS measurement. The network area in which the mobile device was operating may be a region selected from a number of predefined network regions, as described in co-pending applications GB1820857.9 and GB1820852.0, which are hereby incorporated herein by reference 4) The location of the cell site which was serving the mobile device 110a at the time the measurements were taken.

5) The (compass) bearing of the mobile device 110a from that cell site.

6) The approximate distance of the mobile device 110a from the cell site's location.

The measurements batch processor 134 typically runs periodically (hence the requirement for the data queue 132), with an interval between initiating each run typically being around five minutes.

Although only a single measurement collection server 130 is shown in FIG. 1, it is possible to have multiple measurement collection servers 130, each feeding one or more batch processors 134.

Advantageously, the asynchronous subsystem 119, or components thereof, may be scalable—i.e. more (cloud) computing resources may be added as required, depending upon the volume of measurements being received at a given time. This may well increase over time as more customers are encouraged to sign-up to use the operator's service-reporting app.

Synchronous Subsystem—Live-Data Collection Path

Synchronous subsystem 121 collects triggered network performance measurements 122 from a mobile device 110b (which may or may not be the same as mobile device 110a). The triggered measurements comprise 'live' data, in the sense that they record the network service quality the device 110b is experiencing at that point in time (for example, received signal strength, transmitter output power, received and transmitted data rates, latency, voice quality, bit error rate, signal-to-interference, noise and distortion—SINAD—and any other metric which the mobile device 110b is capable of reporting).

Triggered measurements 122 may be transmitted to the synchronous subsystem 121 in response to the generation of subjective data. For example, a user performing a status check from their mobile device 110b may cause triggered measurements 122 to be obtained from the mobile device 110b which requested the status query.

Triggered measurements 122 may also be requested from other mobile devices 110b which have not initiated a status query, but which happen to be local to an area of interest, for example an area of interest associated with a (different user's) user query. The area of interest may be based for example upon the number of status checks in that area or a specific operator interest (such as a stadium during an event). In both cases, the trigger for the collection of triggered measurements 122 is subjective, i.e. a network user is, in their opinion, experiencing a poor or degraded level of service relative to that which they have experienced in the past or would reasonably expect to receive. This is inherently subjective, as different users will have differing opinions (or thresholds) as to what constitutes 'poor' or 'degraded'. Collecting triggered measurements 122 from other mobile devices 110b may aid in determining whether the issue which caused a user to initiate a status check is unique to that user (meaning that it may well be a problem with their mobile device 110b) or more general to the area (and if so, ascertain how widespread the issue might be). A more general experience of the problem (e.g. a low data rate) may well indicate that there is an issue with the communications network in that area.

Other triggers may also initiate collection of triggered measurements 122, such as submitting web-based status requests or complaints. In this case, full measurement data 122 data may be collected from nearby mobile devices 110b while simpler data (such as network speed) may be collected from the web-based user or users. It is also possible to infer the identity of the connection type of the web-based user (i.e. Wi-Fi or cellular). In the case of a cellular connection, the network speed will indicate the user's network experience. If the user is connected over Wi-Fi, this may indicate that there is a catastrophic issue with the cellular network in that area (since the user needs to resort to Wi-Fi to request a status check). Measurement data from web-based users can be filtered out (and not used in subsequent fault analysis, for example) if the user is identified as not using the network operator's network when making the status check or not using it in the location about which the status check or coverage query is made.

The synchronous subsystem 121 typically comprises fewer servers (perhaps one-tenth of the number involved in the asynchronous subsystem 119), since far less triggered measurement data 122 is collected (or needs to be collected) than scheduled measurement data 120—triggered measurements 122 only need to be collected in response to a user-initiated status check and there are few of these relative to the number of mobile devices 110b active on the communications network at a given point in time. Essentially, triggered measurements 122 are only uploaded when it is interesting to do so, that is, there is an immediate reason to do so, and this uploading is undertaken effectively immediately. This type of measurement collection is classed as 'synchronous' as measurements are elicited (either by the system 100 or otherwise) from the user device 110b, with the user device then responding effectively immediately and the resulting measurement data being processed into database 140 immediately upon receipt, rather than being batched for later processing.

The synchronous subsystem 121 illustrated in FIG. 1 comprises a triggered measurements server 136. The triggered measurements server 136 collects, formats, and enters the triggered measurements 122 into the database 140, optionally along with one or more of the following:

1) Anonymised identification—the identifier of the mobile device 110b from which the live measurement data 122 originated is discarded and an anonymous (random) identity is attached. This allows the live measurement data 122 from a particular mobile device 110b to be assessed over time without (potentially) infringing the privacy of the user of the mobile device 110b. Anyone interrogating the database 140 would be unable to identify the mobile device 110b or its user, only that measurements have come from the same mobile device 110b.
2) A randomised identifier for the live measurement data report itself, to allow duplicates to be recognised and eliminated.
3) A location identifier indicating the network area in which the mobile device 110b was operating at the time the measurements were taken (as discussed above in relation to scheduled measurements).
4) The location of the cell site which was serving the mobile device 110b at the time the measurements were taken.
5) The (compass) bearing of the mobile device 110b from that cell site.
6) The approximate distance of the mobile device 110b from the cell site's location.

Transmission of triggered measurements 122 to the synchronous subsystem 121 may be triggered by the network monitoring system 100 (for example when system 100 detects receipt of a user query), or another component of the communications network.

Alternatively, transmission may be triggered by the UE 110b itself, for example when the UE detects that its user has made a status query.

In addition to 'live' data—i.e. data measured only after detection of a triggering event, the triggered measurements 122 may also comprise performance measurements already measured and stored as part of a scheduled measurement, but not yet transmitted to the asynchronous subsystem 119 as part of a standard scheduled measurement report 120.

There are a range of mechanisms by which a user may initiate a network performance query (e.g. a 'status check'), which can then trigger collection of triggered measurement data 122. In particular, one or more of the following mechanisms may be used:

1. A call to a customer service centre complaining of poor service or checking coverage at a particular location.
2. A query can be submitted via a network monitoring app, or a billing or other more general customer-service related app, on the user's mobile device.
3. A query can be submitted via a web page (e.g. the operator's website), either on the user's mobile device or any other suitable (fixed or mobile) terminal.
4. Social Media: Social media feeds (e.g. Twitter, Facebook, web-chats etc.) can be monitored (either automatically via suitable software or manually by human operatives) for 'chat' indicating a likely service outage at a particular location.
5. In-store: Many network operators have a presence on the high street via their own, branded, shops or concessions within other shops. Customers will sometimes complain of coverage issues, in person, when visiting such outlets.

The ability to be able to collect live user data immediately, rather than having to wait until the next batch is sent/downloaded automatically, is key in providing timely information to an operator, in order to allow a problem to be quickly rectified. Similarly, the ability to process that live data quickly, rather than it being delayed by large amounts of scheduled measurements for non-relevant network areas, is key to rapidly responding to a problem.

For example, an emerging issue can often be solved quickly (i.e. in minutes) by simply re-setting the piece of equipment which appears to be causing the issue. This can be undertaken remotely (e.g. from the network operations centre) and therefore not require a site visit by a maintenance team. Likewise, the issue could have been caused by a software upgrade to some part of the network or a network configuration change (e.g. a remotely-controlled change to the pointing angle of an antenna)—in either case it is a relatively simple matter to reverse the update or change and (hopefully) restore service to the user concerned, without necessitating a site visit.

Database 140

The database 140 stores the measurement data 120, 122. Data may be stored in the form of records or tuples, within tables, in the database structure. The database is typically an off-the-shelf product (such as Oracle®, Postgres® and the like) which is configured for this specific application (i.e. that of storing, and allowing access to, data collected from individual mobile devices 110a, 110b). It may be accessed by the network operator directly or by other systems owned, managed or used by the network operator.

The database 140 may also store data from a range of other pertinent data sources to aid in fault diagnosis, such as:

1) Data 141 relating to network change requests (requests for changes to the network configuration, such as the position or pointing angle of one or more antennas, the installation or de-commissioning of a base-station, etc.) and/or planned maintenance operations. This can help to inform decisions regarding whether a network change may be the root cause of an increase in the number of status checks locally to the change or if they may simply be as a result of a planned local outage in the network for maintenance or upgrade purposes.
2) Data 142 relating to 'trouble tickets' and/or known incidents on the network. These are incidents or problems of which the network operator is already aware and which may or may not be being dealt with already. Such information can be communicated to the users (e.g. in response to a status check), as appropriate.

3) Data 143 relating to network configuration information, such as cell-site locations, RNC/BSC parents and connectivity, antenna pointing angles, transmit power levels, etc. This information can be used, for example, to determine from which nearby user devices measurement data should be requested, in the event of one or more local users initiating a status check.

4) Data 144 relating to network alarms. This can be used to correlate status checks and (poor) measurement data with known alarm conditions and, potentially, thereby raise their status within the maintenance hierarchy.

5) Data 145 relating to network performance characteristics, such as the amount of traffic being handled by each cell and the availability of each cell.

6) Data 146 from a network planning tool, including the designed network topology (which may not necessarily exactly match the network as deployed). This database will contain coverage maps and coverage predictions and may be used to assess whether the reported issue stems simply from the fact that the user is outside of the designed network coverage area.

Data 143, 145 and 146 in particular may provide the basis for a root-cause analysis to be undertaken, in order to identify the location (within the network hierarchy) of the faulty element.

User Report Subsystem

Figure 2:
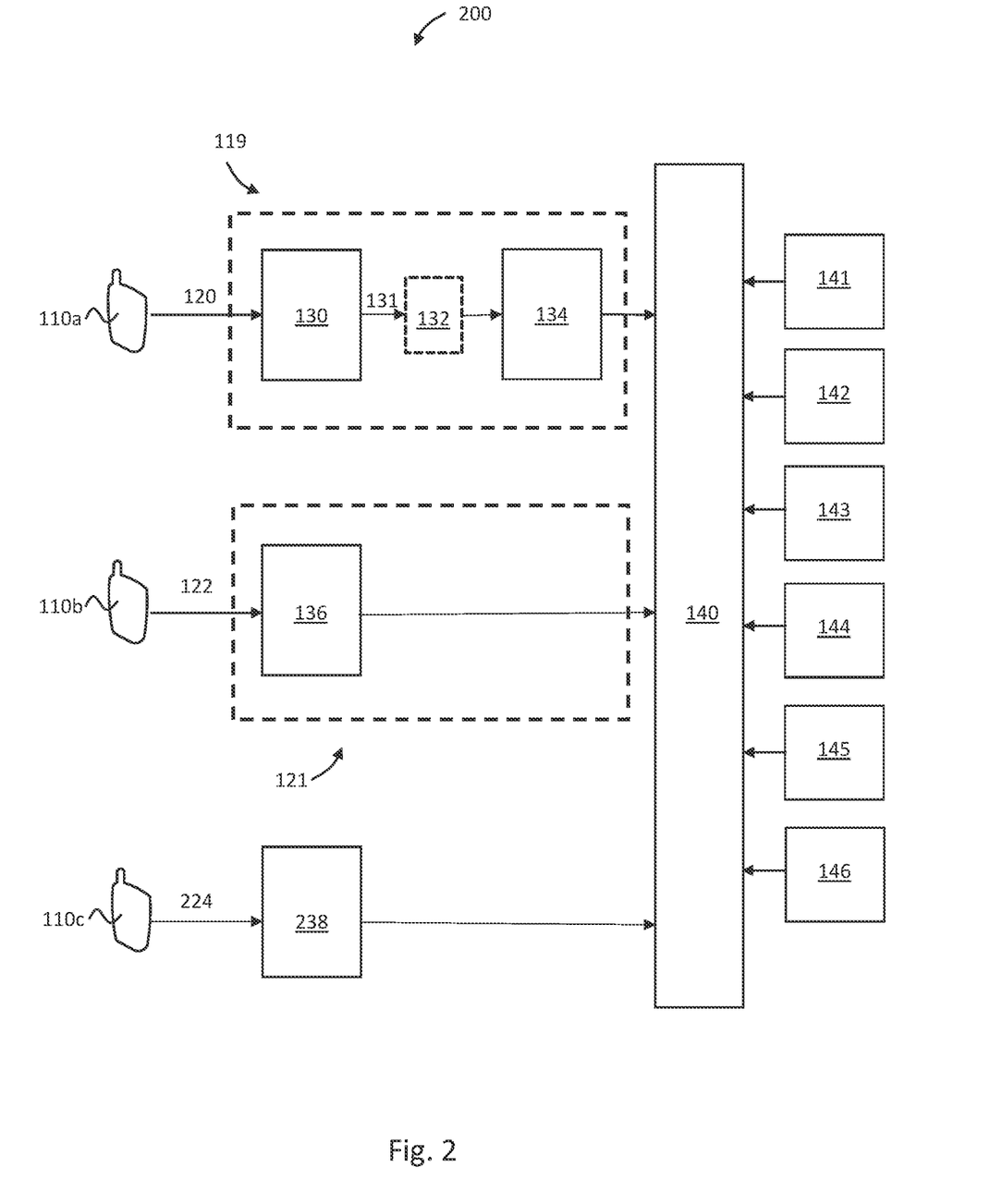
FIG. 2 illustrates an alternative network monitoring system.

FIG. 2 illustrates an alternative network monitoring system 200. Network monitoring system 200 comprises all the features of system 100 (represented by the same reference numerals as in FIG. 1), performing the same functions of collecting and storing scheduled and triggered network performance measurements—i.e. 'objective' data.

System 200 further comprises a user report subsystem 230, configured to receive user queries/status checks 224 from a user of a device 110*c* (which may or may not be the same as mobile devices 110*a*, 110*b*), and to store received queries in database 140. Subsystem 230 thus collects 'subjective' data. Subjective data collected by the user report subsystem 230 may generally be considered to be any performance data related to a user's perception of network performance.

As discussed above, user queries may be received directly from a device 110*c* (e.g. from an app), or indirectly (e.g. via a call centre). For example, user network performance queries may be received by one or more of the following methods:

Status checks—these are checks made by the user, typically using an app on their mobile device 110*c* that has been provided for the purpose by the network operator (the app typically has many other functions as well, such as providing the ability to access the user's bill, usage to date, coverage maps etc.). The user will typically undertake a status check when they are experiencing a problem with the communications network or when they are receiving a poorer service than they might expect. A status check typically involves pressing a virtual button in the app on the touch-screen of the mobile device 110*c* which sends a message to the network operator asking if there is any known problem on the communications network local to the user. If there is a known problem, an explanatory message will typically be sent to the user's mobile device 110*c* in response, acknowledging that there is a problem and perhaps indicating the nature of the problem and when it will be rectified. A status check can also be undertaken in a similar way using a web browser pointed to the operator's website.

Feedback reports—these can either be reports voluntarily submitted by the user (for example, via the network operator's website) which are essentially complaints about the service the user is receiving, or reports elicited by the network operator sending out a survey to selected users. Such surveys could, for example, be targeted at users in an area where it is possible that a problem exists—where other local users have undertaken status checks, for example—and the network operator wants to understand other users' experiences.

Notification subscriptions—users can subscribe to notifications relating to when a network repair will be completed. A large number of such subscriptions (in a given area) could indicate that a large number of users are very unhappy about the service (or the lack of service) that they are currently receiving and are keen to know the moment it is restored to normal.

Calls to a call centre—users may call a customer service call centre to ask about the status of the network in their local area and to report problems with their service. A large number of calls from a particular area could indicate that there is a problem in that area.

Each of these options may be considered to be a 'network performance query' within the meaning of the present disclosure.

There are, of course, many other possible ways in which a user could communicate their subjective view of the network (for example, via social media, either involving the operator or just complaining generally). It should be emphasised that all of the above queries (from users) are subjective—they relate to the user's perception of the network—and do not necessarily indicate that a fault exists, simply that the network, for whatever reason, does not meet the expectations of that particular user, in that particular location, at that particular time. Clearly, however, a large number of such queries, in a given area, at a given time, is potentially indicative of a network problem, even if that problem is simply 'congestion'.

The user queries 224 may be collected automatically (for example, from status checks performed on an app or website, or electronic feedback reports) or manually entered (for example, following a call with a call centre, the operator may manually enter the user queries 224 into the user report subsystem 238). The user report subsystem 238 processes the user query 224 into a format suitable for database 140, before loading the user query 224 onto the database 140 where it is associated with an anonymised device identifier for the particular mobile device 110*c*, to allow the subjective data to later be associated with other relevant performance data for the particular mobile device 110*c*, such as the objective measurement data discussed above.

Combining Subjective Data and Objective Data

When data in the database 140 is associated with an (anonymised) identifier for each mobile device 110*a-c*, subjective data (e.g. user queries received by user report subsystem 238) based on status checks and other information provided by the user of the mobile device 110*c* can be associated with objective data (scheduled and/or triggered measurements 120, 122) from the same mobile device 110*a,b*.

For example, if a user requests a status check from the network operator's app running on mobile device A, data relating to the status check will be stored on the database 140 with an anonymised identifier associated with mobile device A. Simultaneously, or soon after, triggered measurement data 122 may be requested from mobile device A, either by the triggered measurements server 136 (or generally system 100), or the app itself, and this triggered measurement data 122 may also be assigned to the anonymised identifier associated with mobile device A.

Asynchronous measurement data 120 derived from mobile device A may also be assigned to the anonymised identifier associated with mobile device A. The timestamp associated with the or each batch of asynchronous measurement data 120 may be used by system 100 to determine the relevance of this data to the current issue (if any) which resulted in the user requesting a status check. For example if the timestamp indicates that the or a batch of data is more than H hours old, then that measurement data may be disregarded in any fault analysis or diagnosis if H is greater than a threshold duration (1 hour or 4 hours or any other value).

In this way, the subjective and objective data may be combined when the database is queried to form a richer and more powerful resource to assist the network operator in identifying and diagnosing faults within the network.

User Feedback

In addition to the main database 140 being connected to an operator's other systems, it may also connect to a user-feedback subsystem to inform the user of likely faults, and/or provide estimates of repair times. For example a user feedback subsystem may provide a colour coded response to indicate to the user whether the network is (or should be) operating normally at his/her location (in response to a status check), together with an appropriate message from the operator, for example to indicate a time-to-repair for the fault (if a known fault is present).

Identifying Faults Using Subjective and Objective Data

Figure 3:
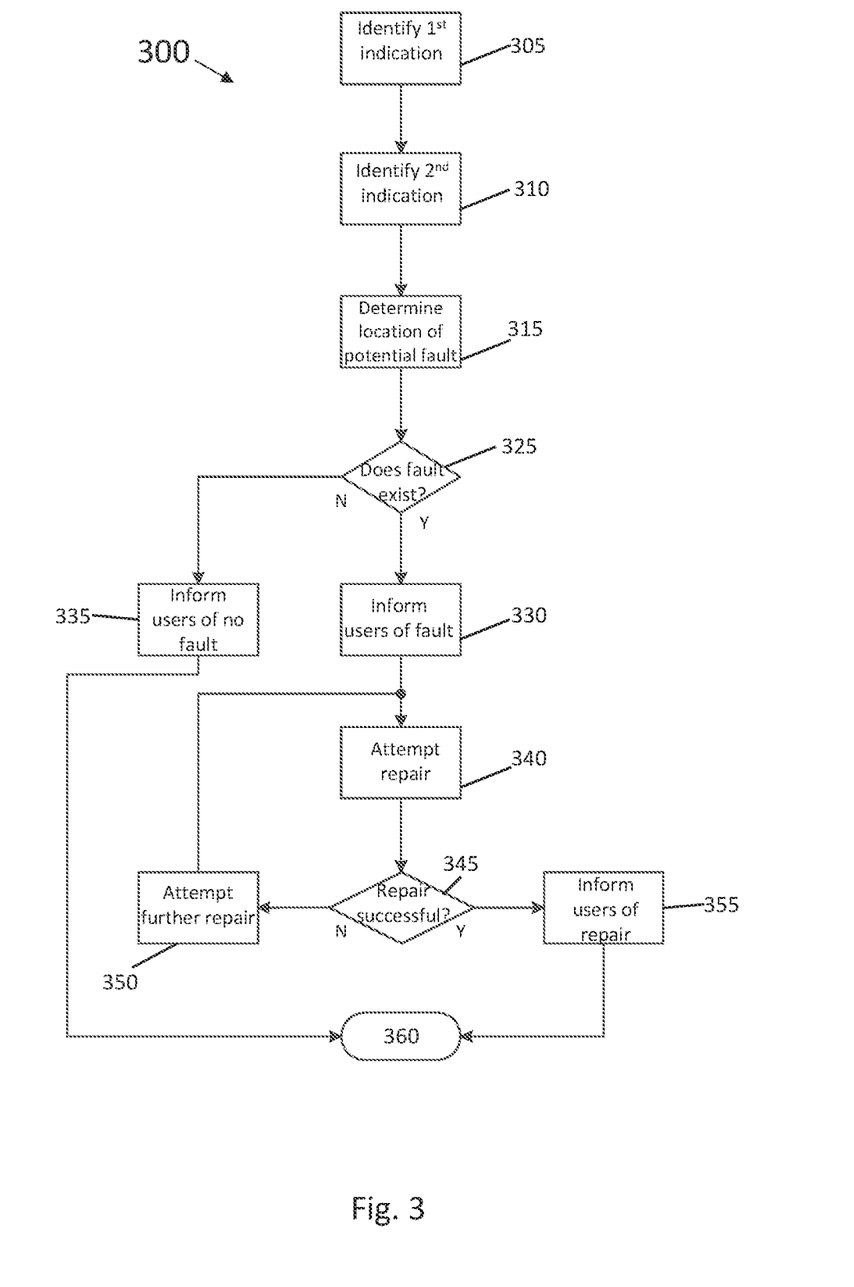
FIG. 3 illustrates a method of identifying faults in a utility supply network based on subjective and objective data.

FIG. 3 illustrates a method 300 of detecting faults in a utility supply network. Method 300 uses objective measurements of network performance, such as triggered or scheduled measurements as described above, to confirm the presence of an apparent network problem indicated by a rise in subjective user queries.

Method 300 starts at step 305, at which a first indication of a fault (or other problem) in the network is identified by counting the number of network performance queries/reports received from users of UEs connected to the network in a first region. The user queries may be any of the user queries/reports discussed above, and may be retrieved from the database 140 of the network monitoring systems described above.

User queries may be assigned to a predefined region based, for example, on a geographical location of the UE at the time of the query, or base station the UE is connected to at the time of the query. The network may be divided into a number of predefined regions, such as hexagonal regions. The predefined regions may have different sizes, for example depending on an expected number of users in the region, or on the region type. Thus rural areas may be covered by larger defined regions than urban areas. The assignment of user queries to regions is discussed in more detail in co-pending applications GB1820857.9 and GB1820852.0, which are hereby incorporated herein by reference.

The first indication of a fault may be identified if the number of user queries for the first region is significantly higher than usual. For example, the number of user queries received within a particular (sliding) measurement period (e.g. 3-5 hours) may be compared to a threshold. If the number of queries exceeds the threshold, the first indication of the fault is identified. The threshold will vary from area to area and operator to operator. For example a group of 5 reports in a busy city-centre cell may not count as significant, whereas a similar grouping in a more sparsely used rural cell may represent a significant percentage of its typical user-base and hence count as 'significant' in that case. What counts as 'significant' may also vary depending upon the time of day, day of the week or type of day (e.g. weekend, Bank Holiday, etc.).

The method then proceeds to step 310, at which objective network performance data are used to provide a second indication of a fault. The network performance data may be network performance characteristics measured by UEs (e.g. the triggered or scheduled measurements discussed above), or data provided by components of the network, such as component alarms, or network performance characteristics such as data rate measured by components of the network. If the network performance data suggests a network problem, the method 300 identifies a second indication of a fault. In particular embodiments, where it is determined in step 305 that a higher-than-threshold number of user queries have been received, the network may request triggered measurements from one or more UEs in the first region (or a sub-region thereof), using the processes described above in relation to FIGS. 1 and 2. In particular, triggered measurements may be requested from UEs of users who have submitted user queries, and/or from UEs within a threshold distances of a UE whose users submitted a user query, or from all UEs connected to the network in the first region or from all users connected via the same network resource or resources (e.g. base-station, RNC, transmission link, etc.).

The process of identifying the second indication in step 310 can take many forms, but at a top-level may comprise comparing the various items of measurement data to past data gathered when there were few or no complaints. If the recent data shows an above-threshold difference in one or more areas (e.g. the signal strength has dropped by 10 dB from what users have typically experienced in the past, or a component alarm has activated), then this is a likely indicator of a fault.

The second indication may itself be further confirmed based on additional objective data. For example, the following data types may be used (note one or more of the following may also be used as the main data for the second indication, in which case it would not be used again for the confirmation step):

Component alarms, which may show one or more alarms pertinent to the first region (e.g. UEs in the first region connect to the network via the component associated with the alarm);

Planned maintenance/change requests, which may indicate that work is underway in the first region or a known problem exists for which a change has been identified (but not yet implemented);

'Trouble-tickets' and incidents, which may contain details of known problems or network damage (e.g. from a lightning strike or high winds);

Network plans (e.g. from a network planning tool), which may contain details of the designed and simulated parameters expected at a given location. If the actual measurement data (from measurements undertaken by the UEs or the network itself) significantly deviates from these parameters, then this may be an indication of a fault.

Note that the above list is not exhaustive.

It is to be noted that the step 310 may be performed before step 305—that is the objective network performance data may provide the first indication, and the user queries may provide the second indication.

Optionally, the illustrated method 300 then proceeds to step 315. Alternatively, however, method 300 may proceed directly to step 325, discussed in more detail below. In step 315, an attempt is made to diagnose the likely network component or subsystem in which the fault has occurred, based upon the objective and subjective data available to the operator (e.g. the information in database 140, discussed above). Using a combination of the subjective user queries and objective network performance data may allow for a more accurate determination of the source of the fault than would be possible based on one type of data in isolation.

For example, a cluster of user queries in a particular area, served by a single base transceiver station (BTS), together with measurement data from the users' mobile devices indicating a marked drop in received signal strength when compared to historic data for the same BTS/cell/area and an alarm indicating a failure in a power supply which supplies that BTS gives a very strong indication of the piece of equipment (the power supply) which needs to be repaired or replaced. If any of the component parts of the diagnosis operation is or are taken away, for example if user status-check information is not available, the operator may still be able to diagnose the possible existence of a fault, but wouldn't know if this was due to the failure of the power supply (in which case he might choose to replace it urgently) or if it was simply a failure of the alarm itself, providing a false reading (in which case a repair could wait until the next scheduled maintenance visit, since the fault would have no impact on coverage or service quality as perceived by network users). Adding in the user status-check information makes the situation clear: either there are a large number of status checks, in which case the power supply has indeed failed, or there are few or none, in which case it is the alarm signal which has failed. Likewise, if there is no empirical measurement data, the large number of status checks could simply be due to a local effect, such as network congestion, a bus or lorry blocking the signal in a small, but popular, area (e.g. a station plaza) or a natural change in the service level (e.g. roaming from 5G to 4G, due to the former having not been rolled-out to cover that specific location, as yet). None of these scenarios indicates a fault which needs repairing.

The method then moves on to step 325, in which, if both the first and second indications of a fault have been identified, it is determined that a fault exists in the first region of the network.

The method 300 then proceeds to optional steps 330-360, in which users are informed of the fault, a repair is initiated, and the repair is validated. Other embodiments may use only a sub-set of the following steps, or none at all.

Upon determining that a fault does really exist, the method 300 proceeds to step 330. At step 330, a message is transmitted to the one or more users (e.g. all in the first region, or users that have submitted a user query) indicating that there is a fault in the first region. The message may also indicate an estimated time by which the fault will be repaired, and possibly an indication of the nature of the fault.

The method then moves on to step 340, in which one or more actions is undertaken in an attempt to rectify the fault. Such actions could include remotely resetting or re-booting a piece of equipment, or dispatching a maintenance team to a remote site in order to replace a broken component.

Once the remedial action is deemed to be complete, for example upon receipt of an indication by a repair team that the repair has been completed, the method moves on to step 245. At step 245, the repair is validated to determine whether it was successful, based on, for example, the objective and subjective data discussed above.

For example, if the poor UE or network performance characteristic measurements have improved (e.g. beyond a threshold level of improvement) and/or if the number of user queries has significantly reduced, it can be determined that the repair was successful. Relying upon a drop in user queries alone may not be sufficient, since these could reduce naturally for other reasons. For example, if a problem occurs in the early evening (when the network is busy with active users) and is then repaired in the early hours of the morning (when the network is lightly-loaded), there may be few customer complaints, even if the fault still exists, due to most users being inactive. Their UEs, however, may still be turned on and hence can provide measurement data which can indicate that the repair has probably been successful.

Alternatively, the repair could be validated using the methods discussed below in relation to FIG. 4.

If the validation step 345 indicates that the repair has been successful, then the method moves to step 355, in which a message is sent to the users (e.g. to the users who submitted queries, or have connected to the network in the first region), indicating that the fault has been remedied.

If, on the other hand, the validation step 345 indicates that the repair has not been successful, then the method moves to step 350, in which the continuing existence of the fault is communicated to the network operations team and further investigations can take place. The method may then loop-back to step 340 in a further attempt to solve the problem. Step 350 may also include the sending of a message to the users indicating, for example, that the repair is taking longer than expected.

The method then ends at step 360, although it may be re-run frequently (and possibly continuously).

Returning to step 325, if both the first and second indications of a fault have not been identified, the method may determine that a fault does not really exist, and may proceed to step 335. At step 335, a message is transmitted to one or more users who submitted user queries indicating that no fault appears to be present in the first region. This message may also invite them to complete a survey or other more detailed response, if they still believe they are suffering poor service and this may form further input for when the method is re-run. The method then ends at step 360, although it may be re-run frequently (and possibly continuously).

Validating Repair

As discussed above, there is a need for a mechanism to allow repair of a fault to be verified by the network operator. In some cases, this may be because the network operations team has undertaken a repair that they believe will resolve the issue—it may be that they have repaired or replaced equipment which was reporting an alarm condition, for example.

Whilst this may have resolved the issue, it is also possible that the repair did not work, or only partially resolved the issue. Likewise, a maintenance team may have undertaken a routine maintenance visit, or upgraded a site with new equipment, and believed that they left the site in a fully-functional state, but human error or a new fault arising from the equipment having been disturbed may mean that the site is no longer fully functional or does not have the coverage which it originally had.

It is, of course, possible to identify such problems as described elsewhere in this disclosure, i.e. by means of assessing the number and rate of build-up of 'status checks' and other subjective data. Whilst this will work, it has two issues:

1. It may be a lagging indicator—it waits for a sufficient number of users to experience a problem and to report it, before flagging up the problem to the operator.

2. Customers are impacted. During the time taken to flag-up the problem, a significant number of customers may have been impacted (many more than may have submitted status checks)—this period may be many hours, or even a day or more at a lightly-used site.

Figure 4:
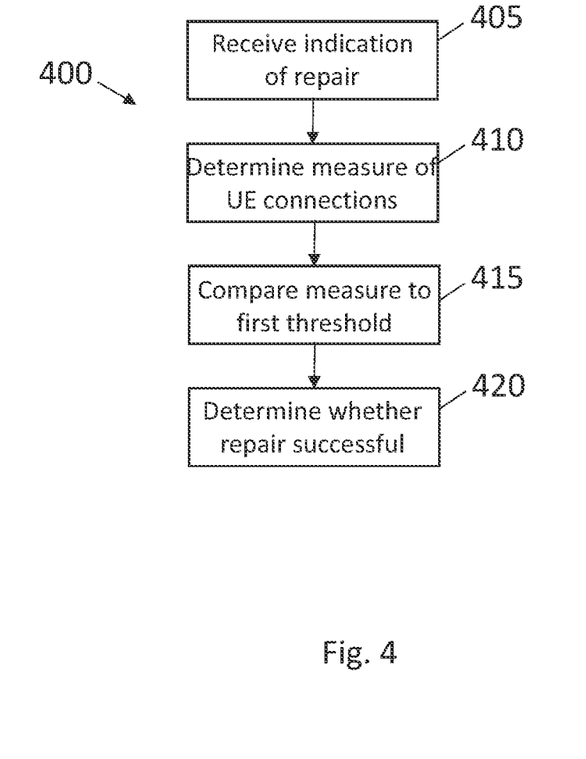
FIG. 4 illustrates a method of validating a repair of a network component.

FIG. 4 illustrates a method 400 which provides an alternative solution to verifying repairs. Method 400 monitors behaviour of the site or resource, via user device-derived measurement reports and/or the number of active calls (or other user activity) being handled by the site or resource (and potentially also their duration). In this way, it is possible to quickly build up a picture as to whether the site is now operating normally, limiting any lag time before the faulty repair is noticed. In particular, a comparison of these metrics may be made with an equivalent time prior to the fault/repair/maintenance visit, in order to judge if 'normal' service has resumed.

Method 400 begins at step 405, at which an indication is received that a repair of a network component in a first region of the network has been completed at a repair time. The indication may for example be a signal sent to a network monitoring system (e.g. triggered by a repair team), or may be a phone call, message, etc. sent by or on behalf of a repair team, which may be manually entered into a network monitoring system. The network monitoring system may for example be a network monitoring system as described above in relation to FIGS. 1 and 2.

The method 400 then proceeds to step 410, at which a measure of the number of user equipments (UEs) that have connected to the network in the first region after the repair time is determined. For example, the measure may be a direct count of connected UEs, or an indirect measurement; such as number of active calls received, or number of scheduled and/or triggered measurement reports received from UEs in the first region. The measure may indicate the number of connections within a particular measurement period, or may indicate the number of active connections at a particular point in time.

At step 415, the measure of the number of UEs connected within the measurement period is compared to a first threshold. The first threshold may for example be an expected number of UEs to connect to the network in the first region (or equivalent for indirect measurements such as active calls). The first threshold may be, or may be based on, the number of UEs (or equivalent) connected to the network during a period of normal operation, of the same duration as the measurement period. The period of normal operation may be selected to be a time of similar expected network usage as the measurement time, for example the same time of day, same time of week, etc.

The method 400 then proceeds to step 420, at which it is determined whether repair of the component was successful based on the comparison of the measure of the number of UEs to the first threshold. In particular, if the measure of the number of UEs exceeds the first threshold, it may be determined that the repair was successful. If not, it may be determined that the repair was unsuccessful, or additional checks may be performed using a different measure of network usage. Method 500, illustrated in FIG. 5, includes such additional checks.

Figure 5:
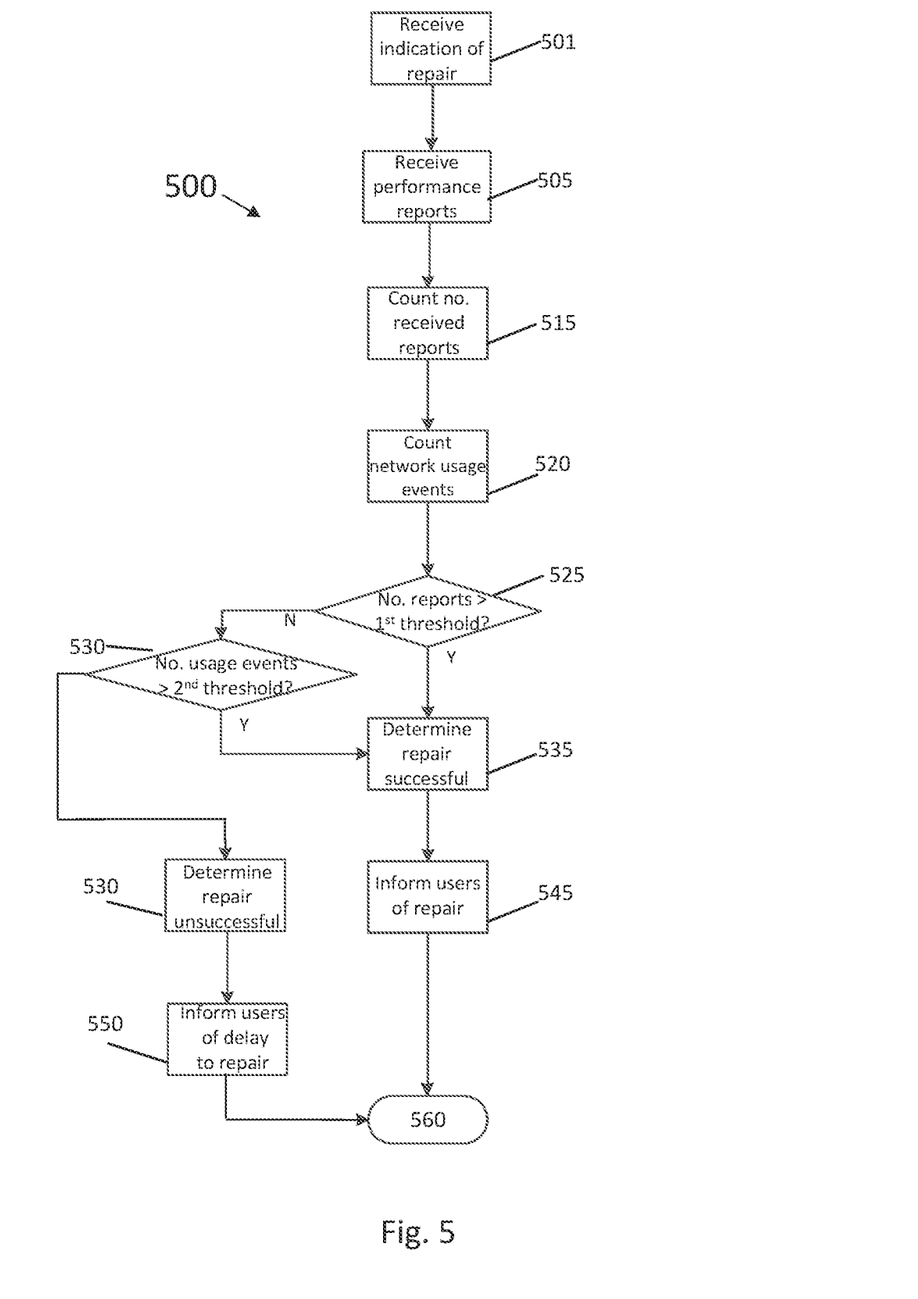
FIG. 5 illustrates an alternative method of validating repair of a network component.

FIG. 5 illustrates a method 500 that is a specific implementation of method 400. It is to be appreciated that other embodiments may include only a sub-set of the steps described below, or none at all.

Method 500 starts at step 501, at which the indication of completed repair is received, and moves then to step 505. In step 505, the network requests or receives network performance measurements from one or more UEs connected to the network in the first region (or a sub-region thereof). The network may use a network monitoring system such as system 100 or 200 to trigger, receive, and store the measurements from the UEs. In particular, the network performance measurements may be scheduled and/or triggered measurements, as discussed above in relation to FIGS. 1 and 2.

The method then moves to step 515, in which the number of measurement reports received within a given measurement time period is counted. The length of the measurement period used may vary depending upon, for example, the popularity (e.g. average number of users) of the site or resource which has been repaired—the more popular the site, the shorter the time period may be. It may also depend upon the time of day (or night) and/or the day of the week—a shorter period may be allowable at a busy time for the network and a longer period may be necessary at quiet times (e.g. overnight). In general, the shortest credible time will be chosen, as the operator will want verification of a successful repair and will also want to communicate this to (local) users at the earliest opportunity.

In some embodiments, the number of measurement reports may be used alone to verify repairs—i.e. the number of measurement reports is used as the measure of the number of network users in method 400. However, method 500 proceeds to determine an additional measure of the number of network users, to provide a secondary verification step in the event the measurement report threshold is not met.

At step 520, a count is taken of the number of network usage events (e.g. active calls) within the measurement period, or actively underway at a measurement point, made by UEs within the first region. For example, usage events from UEs connecting to the network via the repaired component by be counted. Such usage may be either direct or indirect, so for example a repaired transmission link will not directly connect to the user's device, but will nevertheless handle the resulting voice or data traffic. Network usage events may include active calls, which may include both voice and data calls. Alternatively or additionally, other network usage events such as SMS messages or other messaging formats may be counted. A weighting system may also be employed for each network usage type, for example with SMS messages given the lowest weighting. Alternatively or additionally, the proportion of events of a particular network usage type compared to the total number of network usage events may be used to indicate success or failure of the repair. For example, a preponderance of SMS (e.g. more than a certain % of all events, such as more than 70% and up to 100% of events) may be an indication that a fault still exists, since a mix of traffic would typically be expected, dominated by data calls. The count of network usage events may be a 'snapshot' at a point in time (e.g. "20 calls are simultaneously active right now") or it may be a count taken over a period of time (e.g. "the site has handled 20 calls in the last hour")—the latter potentially being more appropriate for lightly-used sites or lightly-used times of the day (e.g. overnight).

The method then moves to step 525, in which the number of measurement reports received is compared to a threshold. The threshold is set based on the number of measurement reports that would be expected for normal operation, given the expected popularity of the site/resource and the time of day, day of the week, etc. In some embodiments, the number of measurement reports may first be compared to a (high) absolute threshold, the absolute threshold set such that a number of connections makes it very clear that the site must be working satisfactorily, in order for it to support that number of user devices (and is independent of the site popularity, time of day, etc.). If this absolute threshold is not met, the number of measurement reports may be compared to a (smaller) relative threshold, which takes into account expected use of that particular site, time of day, etc. The threshold may for example be a fixed percentage of an expected number, e.g. 25% of the expected number of user reports for the region at that time of day.

If the threshold/s of step 525 are exceeded, then method 500 moves to step 535 in which the method determines that the repair was successful. Following this, the method 500 may move to step 545, in which relevant users are informed of the repair (as discussed in relation to FIG. 3). The method then ends at step 560, but may be re-run whenever a fault is repaired or a maintenance or upgrade is performed.

If, on the other hand, the threshold/s in step 525 are not exceeded, then the method 500 proceeds to step 530. In step 530 the number of network usage events (as counted in step 520) is compared to a respective threshold. This threshold may be based on the number of network usage events expected within the measurement period/expected to be active at a particular point in time, given the expected popularity of the site/resource and the time of day, day of the week, etc. As with the thresholds discussed in step 525, the count of network usage events may first be compared to an absolute threshold, and subsequently to a relative threshold if the absolute threshold is not exceeded.

If the threshold/s of step 530 are exceeded, the method moves to step 535 and proceeds as above for that step and beyond.

If, on the other hand, thresholds of step 530 are not exceeded, then the method 500 moves to step 540 in which the method determines that the repair has been unsuccessful. Following this, the method may move to step 550 in which messages are sent to users of the network. The method then ends at step 560, but may be re-run whenever a fault is repaired or a maintenance or upgrade is performed.

It is to be noted that although method 500 makes use of both measurement reports and network usage events, either one could be used in isolation as the measure of network usage. Moreover, in method 500 network usage events are used as a 'check' on measurement reports. In other embodiments, the order of method 500 may be changed so that the measurement reports provide a 'check' on the network usage events. Further, the steps of method 500 may be performed in any order, so that, for example, the number of network usage events is not counted until after the measurement reports are compared to their threshold. Indeed, the number of network usage events may not be counted at all, if the number measurement reports exceeds the respective threshold (and similarly for the case where network usage events are counted first, and measurement reports used as a check).

Application to Other Utility Supply Networks

It is possible to apply the invention described above to diagnose faults in all kinds of communications networks, including 2G, 3G, 4G, 5G, PMR/SMR, Wi-Fi, etc. Equally, it is possible to apply the invention to a fixed-line data network, such as a 'broadband' internet network (e.g. using DSL, fibre optics or similar). In such a case, the invention could be used to diagnose faults in roadside cabinets containing switching or routing equipment or any other equipment which serves a number of users in a given locality. For example, a user connected to the same roadside cabinet who was experiencing poor service could perform a service check (e.g. using a device connected to a cellular data service) and data about the service could be measured (such as upload and download speeds) from the user and other users connected to the same roadside cabinet.

It is to be appreciated that any of the methods described above may be stored as instructions within a computer program, on a computer readable medium, or within a processor of a computing device such as a network monitoring system.

Although the invention has been described above with reference to one or more preferred embodiments, it will be appreciated that various changes or modifications may be made without departing from the scope of the invention as defined in the appended claims.

The invention claimed is:

1. A method of identifying faults in a communications network, the method comprising:
   identifying a first indication of a fault in the communications network based on a number of network performance queries received from users of user equipments (UEs) connected to the communications network within a first region of the communications network;
   identifying a second indication of a fault in the communications network based on network performance data associated with the first region, wherein the network performance data comprises measurements of one or more network performance characteristics collected from a second plurality of UEs connected to the communications network, wherein the measurements are triggered measurements measured in response to one or more of the network performance queries; and
   determining a fault exists in the communications network based on identification of the first indication and the second indication.

2. The method of claim 1, wherein identifying the first indication comprises:
   counting the number of the network performance queries received within a measurement period;
   comparing the number to a query threshold; and
   identifying the first indication of a fault if the number exceeds the query threshold.

3. The method of claim 2, wherein identifying the second indication comprises:
   receiving first network performance data associated with the first region and with the measurement period;
   comparing the first network performance data to second network performance data associated with the first region and associated with a time period prior to the measurement period; and
   identifying the second indication based on the comparison of the first network performance data to second network performance data.

4. The method of claim 3, wherein identifying the second indication based on the comparison of first network performance data to second network performance data comprises:
   identifying a degradation in network performance in the first network performance data compared to the second network performance data;
   comparing the degradation to a degradation threshold; and
   identifying the second indication if the degradation exceeds the degradation threshold.

5. The method of claim 3, wherein:
   the triggered measurements measured in response to one or more of the network performance queries are received in the measurement period; and the second network performance data comprises scheduled measurements, the scheduled measurements measured and stored in accordance with a predetermined measurement schedule.

6. The method of claim 3, wherein the method further comprises confirming the identification of the second indication based on known issues affecting network performance in the first region.

7. The method of claim 1, wherein the network performance data comprises network performance measurements taken by a UE connected to the communications network in the first region.

8. The method of claim 1, further comprising determining a component of the communications network likely responsible for the fault based on the network performance queries and the network performance data.

9. The method of claim 1, further comprising initiating a repair process to correct the identified fault.

10. The method of claim 9, further comprising, after completion of the repair process, confirming successful repair of the fault based on network performance queries and/or network performance data received after completion of the repair process, and/or based on the number of UEs connected to the network in the first region after completion of the repair process.

11. The method of claim 1, wherein the communications network comprises a plurality of predefined regions, and wherein the method further comprises:
   receiving a network performance query from a user of a UE connected to the communications network; and
   assigning the network performance query to a region of the plurality of predefined regions.

12. The method of claim 1, wherein the network measurement data comprises at least one of: average transmitted data rate, average received data rate, peak transmitted data rate, peak received data rate, received signal strength, packet latency, and packet jitter.

13. A network monitoring system for monitoring performance of a communications network, wherein the system is configured to receive network performance queries from users of UEs connected to the communications network, and to receive network performance measurements, wherein the system comprises:
   at least one processor, and
   a memory storing instructions which, when executed by the at least one processor, cause the processor to:
   identify a first indication of a fault in the communications network based on a number of network performance queries received from users of UEs connected to the communications network within a first region of the communications network;
   identify a second indication of a fault in the communications network based on network performance data associated with the first region, wherein the network performance data comprises measurements of one or more network performance characteristics collected from a second plurality of UEs connected to the communications network, wherein the measurements are triggered measurements measured in response to one or more of the network performance queries; and
   determine a fault exists in the communications network based on identification of the first indication and the second indication.

14. The system of claim 13, wherein the system comprises:
   a database for storing network performance data;
   an asynchronous subsystem configured to receive scheduled network performance data from a plurality of UEs connected to the communications network, and to store the scheduled network performance data in the database; and
   a synchronous subsystem configured to receive triggered network performance data from at least one UE connected to the communications network, and to store the triggered network performance data in the database.

* * * * *